(12) United States Patent
Shirai (10) Patent No.: US 6,687,039 B2
(45) Date of Patent: Feb. 3, 2004

(54) OPTICAL MODULATOR

(75) Inventor: Masataka Shirai, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 09/941,651

(22) Filed: Aug. 30, 2001

(65) Prior Publication Data

US 2003/0007228 A1 Jan. 9, 2003

(30) Foreign Application Priority Data

Jul. 4, 2001 (JP) ........................................ 2001-202912

(51) Int. Cl.[7] .............................................. G02B 26/00
(52) U.S. Cl. ........................................ 359/254; 359/237
(58) Field of Search ................................. 359/237, 254

(56) References Cited

U.S. PATENT DOCUMENTS 6,101,295 A * 8/2000 Mineo et al. ................... 385/1

FOREIGN PATENT DOCUMENTS

| JP | 7-098442 | 6/1994 |
|---|---|---|
| JP | 11-013366 | 6/1997 |
| JP | 2000-258739 | 3/1999 |

* cited by examiner

Primary Examiner—Scott J. Sugarman
Assistant Examiner—Richard Hanig
(74) Attorney, Agent, or Firm—Reed Smith LLP; Stanley P. Fisher, Esq.; Juan Carlos A. Marquez, Esq.

(57) ABSTRACT

To attain a low-voltage driving, a high optical output, a wide band, and better return loss, an optical modulator is provided with an optical waveguide 1 for propagating inputted light, an optical modulator part 2 for varying an intensity of light by applying voltage, a modulator driver circuit 3 for producing or amplifying an electrical signal to be communicated, a terminal resistor 4 disposed on an end opposite to the driver circuit with respect to the optical modulator part, a transmission line 5 which is disposed between the driver circuit and the optical modulator part and transmits an electrical signal to the optical modulator part, and a transmission line 6 disposed between the optical modulator part and the terminal resister. When both ends of a width in parallel with the optical waveguide of the optical modulator are extended perpendicularly to the direction of the optical waveguide to form straight lines 7 and 8, an electrical signal inputted from the driver circuit to the optical modulator part strides over (intersects) the straight line 7 or 8 and at least a part of at least one of the transmission lines 5 and 6 has characteristic impedance larger than output impedance of the driver circuit 3.

19 Claims, 9 Drawing Sheets

S11@20GHz-17.9dB
LENGTH EA MODULATOR : 150 μm
HIGH IMPEDANCE TRANSMISSION
LINE : 110Ω 400 μm

OPTICAL MODULATOR

BACKGROUND OF THE INVENTION

The present invention relates to an optical modulator, and particularly to a traveling wave optical modulator and an optical communication light source in optical communication systems.

RELATED ART

A faster light source for optical communication has been demanded for an optical communication system. Currently, a communication system with a transmitting speed of 10 Gbit/s for each channel has been already put into practical use, and a system with a transmitting speed of 40 Gbit/s for each channel has been developed for practical use. As an optical communication light source used in such a high-speed optical communication system, an optical modulator has been adopted.

As an optical modulator, two kinds of an electroabsorption modulator and a Mach-Zehnder type modulator have been used. For example, as technique for achieving a wide-band modulator as an electroabsorption modulator, JP-A-2000-258739 discloses that a modulator is divided to reduce a capacitance thereof, thereby achieving a wide-band modulator with a high extinction ratio.

Further, JP-A-H11-133366 discloses that a traveling wave electrode is used as an electrode, a thickness of a non-doped layer is reduced, and a modulator length is shortened, thereby achieving a wide band, low return loss of an input electrical signal, and a reduced amplitude of a driving voltage.

Moreover, as for a Mach-Zehnder type modulator as well, JP-A-H07-98442 discloses that an impedance conversion circuit is used for reducing amplitude of a driving voltage to maintain a wide band and low return loss. At this moment, impedance of a traveling wave electrode, which constitutes the Mach-Zehnder type modulator, is set lower for reducing a driving voltage, and an impedance matching circuit is used for impedance matching with a transmission line disposed outside an optical modulator having high characteristic impedance. At this moment, an inductance, a capacitance, and a resistance of a lumped element are used for the configuration, and a wide band and convenience of the configuration are not compatible with each other.

When a driving voltage is reduced, a capacitance of a modulator is increased or impedance is lowered. Thus, reflection occurs on an electrical signal inputted to an optical modulator, a band is reduced, or a deviation of response occurs inside a band. Besides, when a capacitance is reduced or a modulator length is shortened for impedance matching, an extinction ratio is deteriorated. The above problem can be solved by increasing a thickness of a multiple-quantum-well layer. However, when strong laser light is emitted to the modulator, high-frequency characteristics are deteriorated as follows: when a modulator length is short, a density of photo carriers is increased on an undoped layer including a multiple-quantum well and the adjacent region, an electric field applied from the outside is reduced by screening, response to electricity is deteriorated, and a band is reduced.

Additionally, when a modulator is divided into a plurality to widen a band, a band is determined by a capacitance, a resister of a divided modulator, and a terminal resister of a divided modulator and a load resister of modulator driver circuits. In order to widen a band, it is necessary to increase the number of divided modulators. At this moment, the problem is loss of light at a part where two modulators are connected. Further, when the number of divided modulators is reduced, an optical modulator needs to be connected by an electric line having an appropriate inductance for impedance matching. However, since the number of divided modulators is reduced, it is necessary to increase a length of the electric line, resulting in a larger size of the element.

Moreover, when impedance mismatch is matched by an impedance conversion circuit and when impedance lowered for reducing a driving voltage amplitude is matched by a driver circuit, it is not possible to achieve constant response over a wide band.

SUMMARY OF THE INVENTION

Figure 1:
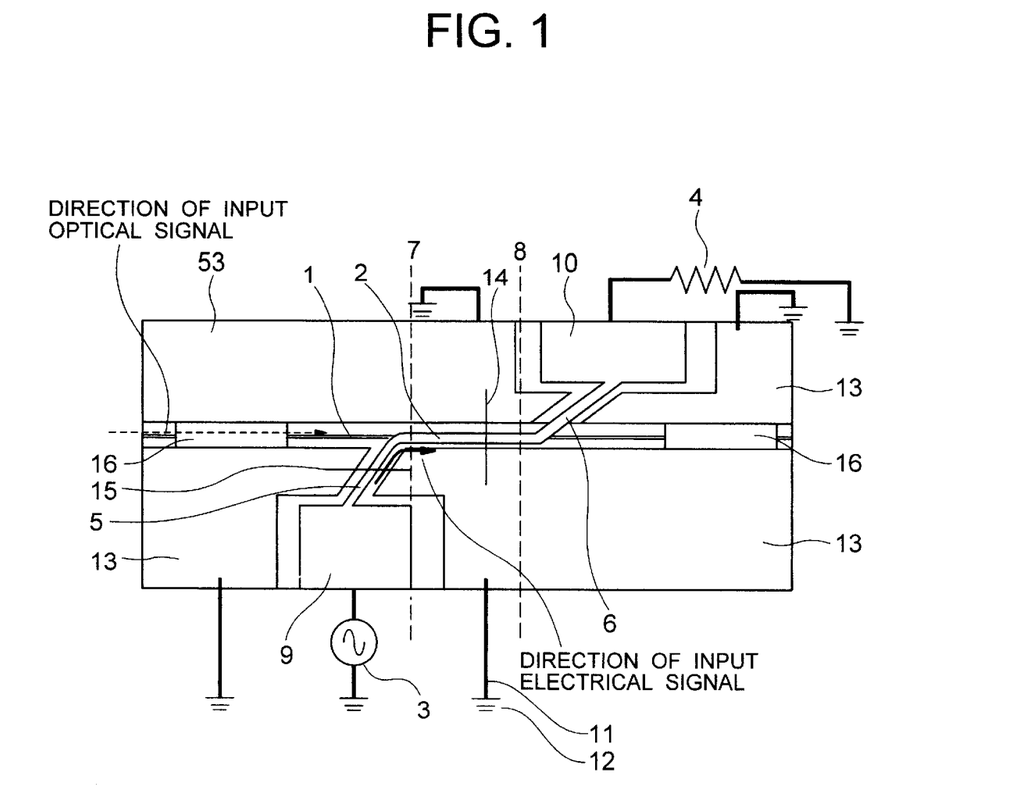
FIG. 1 shows a basic configuration and a driver circuit of an optical modulator according to Embodiment 1 of the present invention.

The following measures are taken to solve the above problems. As shown in FIG. 1, an optical modulator is prepared which includes:

an optical waveguide 1 for propagating light inputted from a laser;

an optical modulator part 2 for varying the intensity of light by applying voltage;

a modulator driver circuit 3 for producing or amplifying an electrical signal to be communicated;

a terminal resister 4 disposed on an end of the optical modulator part that is opposite from the driver circuit;

a transmission line 5 for transmitting an electrical signal to the optical modulator part, the transmission line being provided between the driver circuit and the optical modulator part; and a transmission line 6 between the optical modulator part and the terminal resister.

Assuming that lines (straight lines 7 and 8) perpendicular to the direction of the optical waveguide are provided on both ends of the optical modulator in the direction of the optical waveguide, an electrical signal, which is inputted from the driver circuit to the optical modulator part, strides over (or intersects) the straight line 7 or 8. Further, at least one of the transmission lines 5 and 6 is set such that at least part of characteristic impedance thereof is larger than the output impedance of the driver circuit 3 and it has a suitable length. With this configuration, a driving voltage is reduced and an optical output is improved. Therefore, impedance matching can be carried out on a traveling wave electrode of the optical modulator part, which decreases in characteristic impedance. Thus, it is possible to maintain a wide band of an input electrical signal, reduce a deviation inside a band, and decrease electrical reflection. For example, when the modulator part has impedance of 21Ω and a modulator length of 150 μm, as disclosed in JP-A-H11-133366, a modulator driver circuit system is constituted by a driver circuit having a driver circuit output impedance of 50Ω and a terminal resistor of 50Ω.

Figure 4:
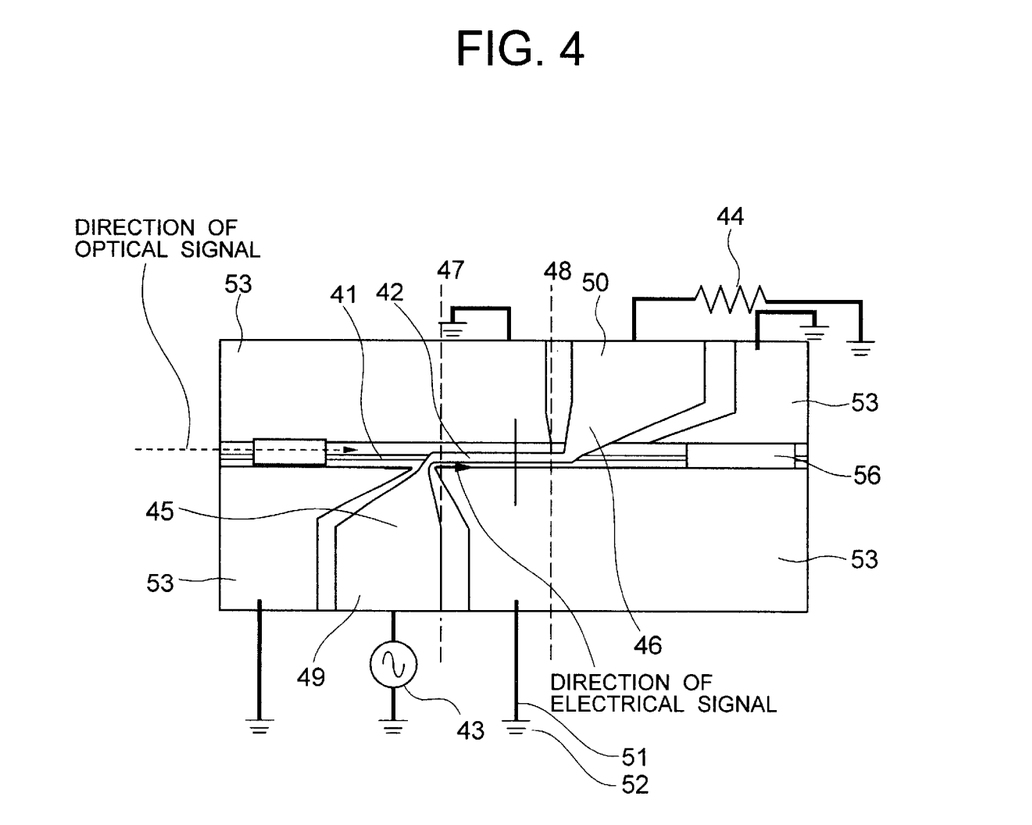
FIG. 4 shows a conventional configuration in which a high impedance line is not used.
Figure 5:
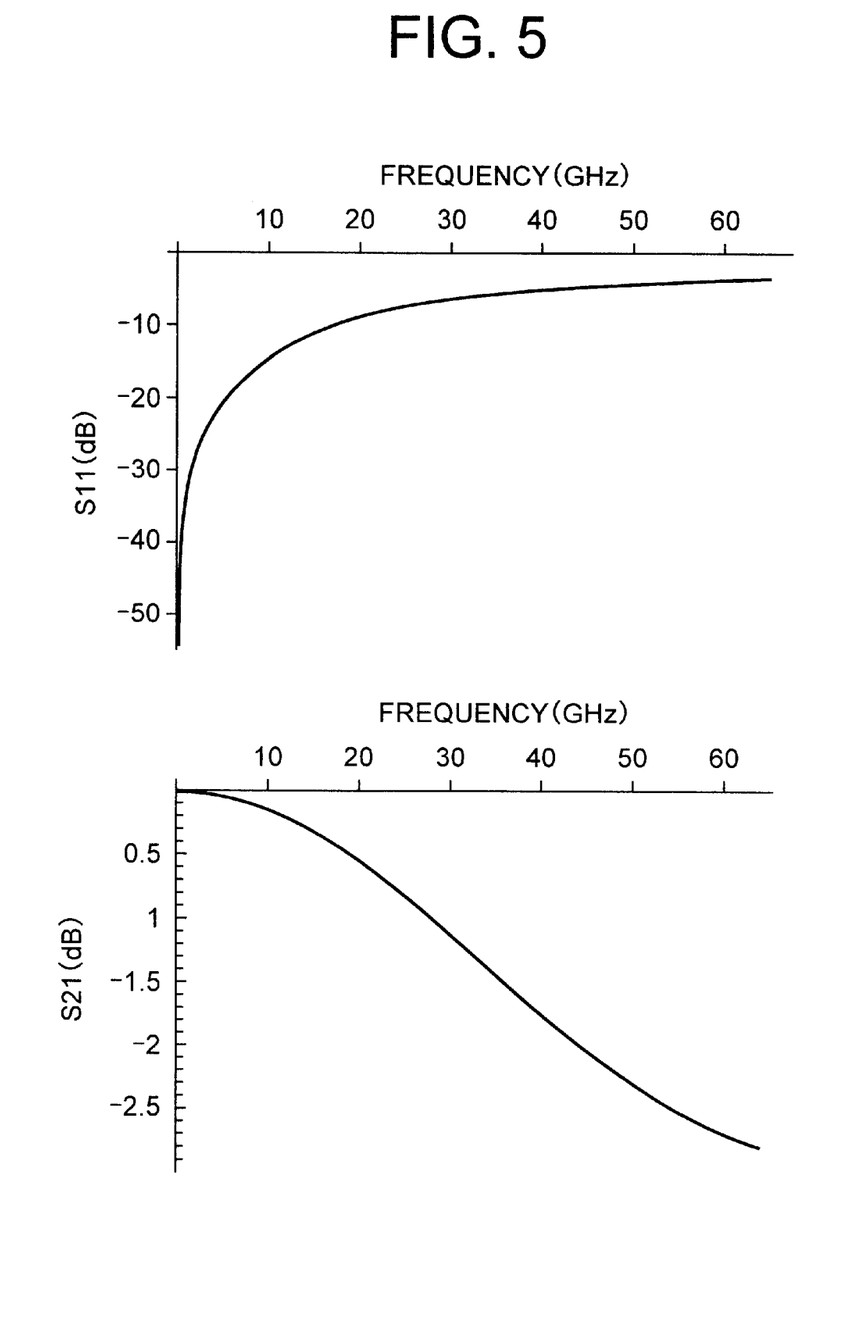
FIG. 5 shows high frequency characteristics of the configuration shown in FIG. 4.
Figure 6:
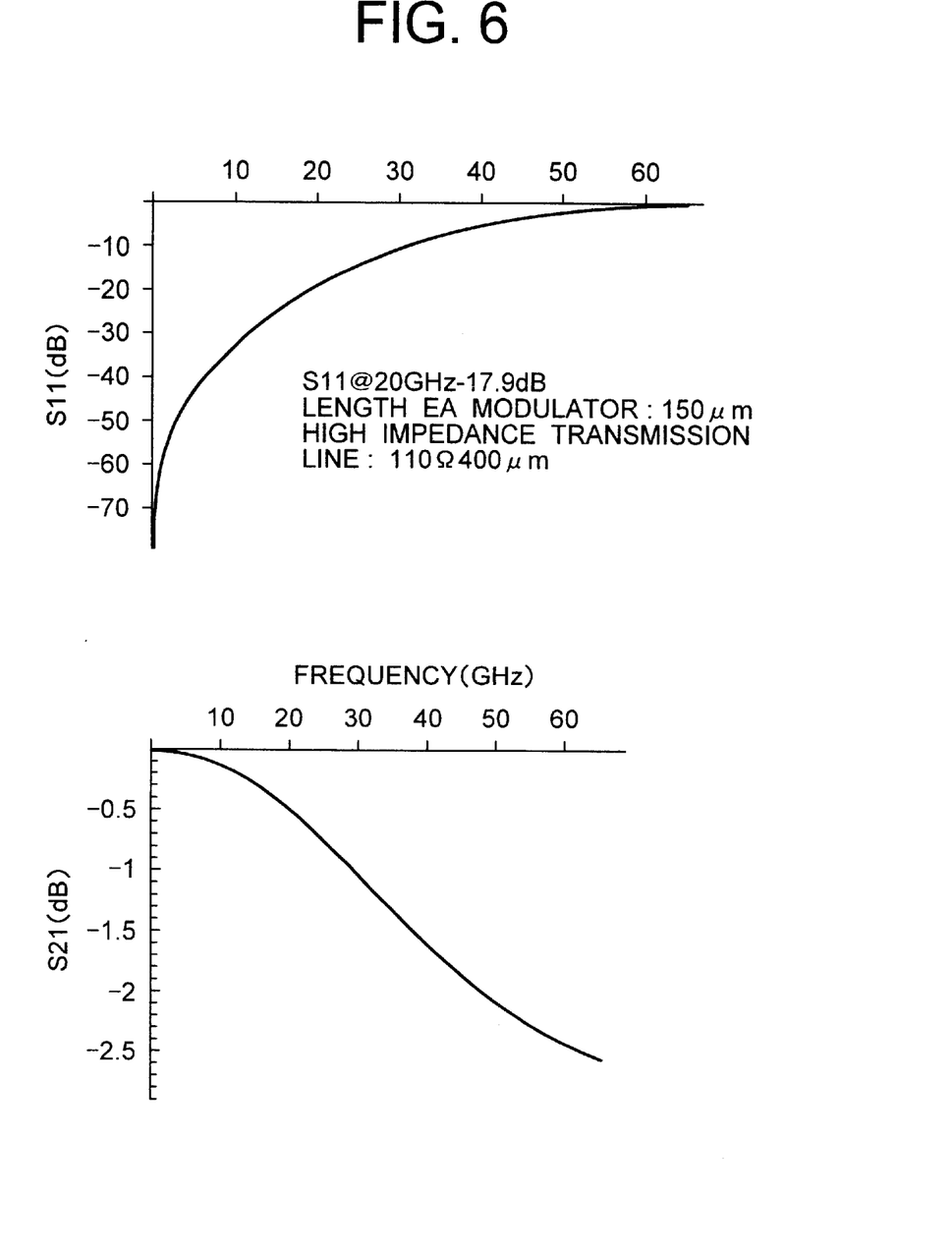
FIG. 6 is a diagram showing high frequency characteristics of the configuration of Embodiment 1.

When description is made using the same members as FIG. 1, in order to design transmission lines (45 and 46 in FIG. 4), which correspond to the transmission lines 5 and 6, at characteristic impedance of 50Ω or an approximate value, the transmission lines 45 and 46 are reduced in width while ratios of widths of the transmission lines 45 and 46 and distances between a ground 53 and the transmission lines 45 and 46 are maintained at values corresponding to a thickness and a dielectric coefficient of a substrate. FIG. 5 shows return loss (S11) and high frequency response (S21) at this moment.

In this case, it is assumed that a data electrical signal of 40 Gbit/s is inputted and used. No problem occurs on the high frequency response (S21) but the return loss (S11) has a large reflectivity of −10 dB at 20 GHz, an electrical signal inputted to the modulator may return to the driver circuit and destroy the driver circuit. Further, since reflection cannot be eliminated on an output end and so on of the driver circuit, multiple reflection varies a modulator driving voltage, thereby deforming an optical waveform.

Meanwhile, FIG. 1 shows an example of the configuration in which the transmission lines 5 and 6 having characteristic impedance of 111Ω are disposed at the front and rear of the optical modulator part 2 having characteristic impedance of 21Ω. At this moment, the impedance of the transmittance lines 5 and 6 can be increased by the following configuration. Ratios of widths of the transmission lines 5 and 6 and distances between the ground 13 and the transmission lines 5 and 6 are reduced, and metal or a layer doped with a high electrical conductivity is placed sufficiently apart under the transmission lines. In this example, a conducting layer right under the transmission lines 5 and 6 is a metallic jig for fixing a semiconductor substrate.

Figure 3:
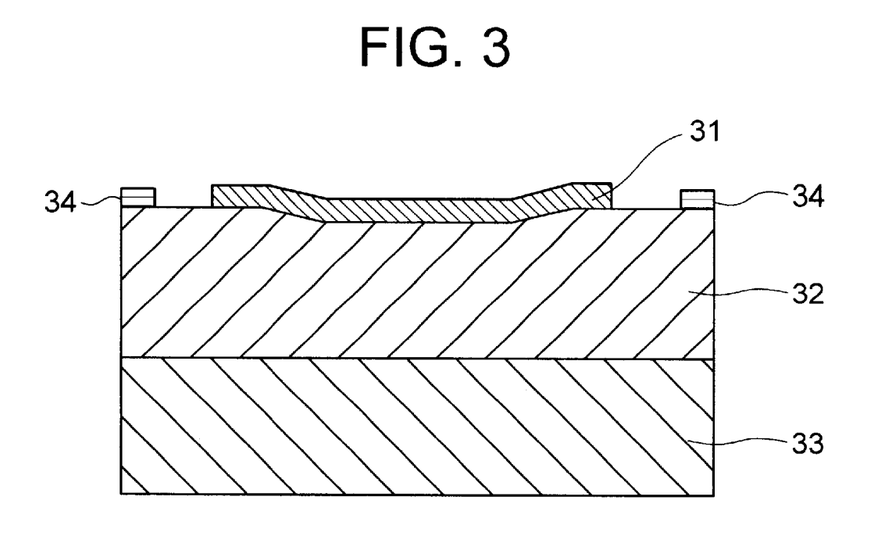
FIG. 3 is a cross-sectional view taken along line 15 on a high impedance line of the basic configuration of the optical modulator according to Embodiment 1.

The cross-section of this part is shown in FIG. 3. Reference numeral 31 denotes an electrode serving as a transmission line, reference numeral 32 denotes a polyimide material having a low dielectric coefficient, reference numeral 33 denotes an anti-insulated substrate, and reference numeral 34 denotes an electrode corresponding to the ground 13. In the case where a data signal of 40 Gbit/s is inputted to the optical modulator in the driver circuit configuration similar to that using the 50-Ω transmission lines, high frequency response is not deteriorated and a reflectivity at 20 GHz can be reduced by about 8 dB.

Figure 7:
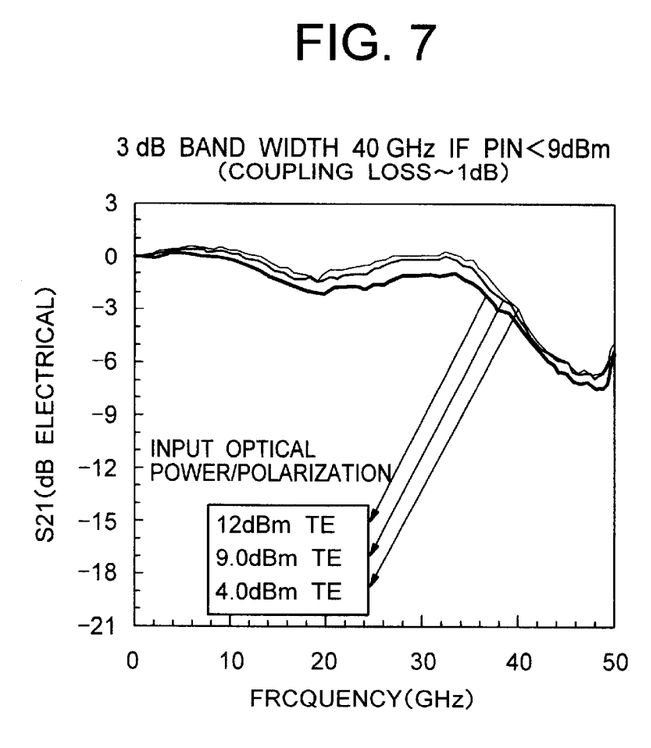
FIG. 7 shows dependence of high frequency characteristics on input light power.

In such improvement in reflectivity, a high impedance line acts as an impedance conversion circuit. As for the optical modulator part, in the case of an electroabsorption modulator using a multi-quantum well as the optical modulating part, conventionally, as shown in FIG. 7, when intensity of light inputted to the optical modulator is at or larger than a fixed value, high frequency response deteriorates. In the case of such an element, an input limit of the optical modulator is about 9 dBm.

It is considered that such deterioration of high frequency response is resulted from two causes. One is that carriers are accumulated on an MQW layer and light cannot be sufficiently absorbed due to a high frequency electrical signal. The other cause is that carriers are accumulated on the MQW layer and the adjacent undoped layer so as to reduce an electric field, resulting in a lower absorption coefficient of the MQW, and more photo carriers are accumulated due to a longer escape time of photo carriers, thereby the high frequency response rapidly deteriorating.

To solve the above problem, since the MQW layer is reduced in thickness, when a strong electric field of several tens kV/cm or more is applied, an electron or a positive hole once excited from a quantum well to continuous state is drawn to a layer disposed outside a quantum well without being drawn to the quantum well again. Thus, it is possible to shorten running time of carriers, restrict accumulation of photo carriers, and prevent high frequency response even when an intensity of input light is large.

Further, it is possible to reduce a density of photo carriers appearing due to small superimposition of fields of light, which is inputted to the MQW layer and propagated in the optical modulator part. Moreover, it is possible to reduce a density of photo carriers accumulated on the MQW layer and the adjacent undoped layer and suppress a reduction in an electric field that is caused by the accumulation of photo carriers, thereby preventing deterioration of high frequency response. At this moment, it is necessary to increase a modulator length to avoid deterioration of an extinction ratio. Deterioration of high frequency characteristics can be prevented by adjusting an impedance value and a length of a high impedance line at the front and rear of the optical modulator part.

PREFERRED EMBODIMENTS OF THE INVENTION

[Embodiment 1]

FIG. 1 shows an upper part of an element of Embodiment 1 according to the present invention, which adopts an electroabsorption modulator using MQW as an optical modulator part. The modulator is composed of an electroabsorption optical modulator part 2 and an optical waveguide 1, which is disposed on the right and left of the electroabsorption optical modulator part 2. The optical modulator part absorbs light by applying an electric field between a ground 13 and an electrode connecting transmission lines 5 and 6. Hence, an electrical signal is converted to an optical signal.

Figure 2:
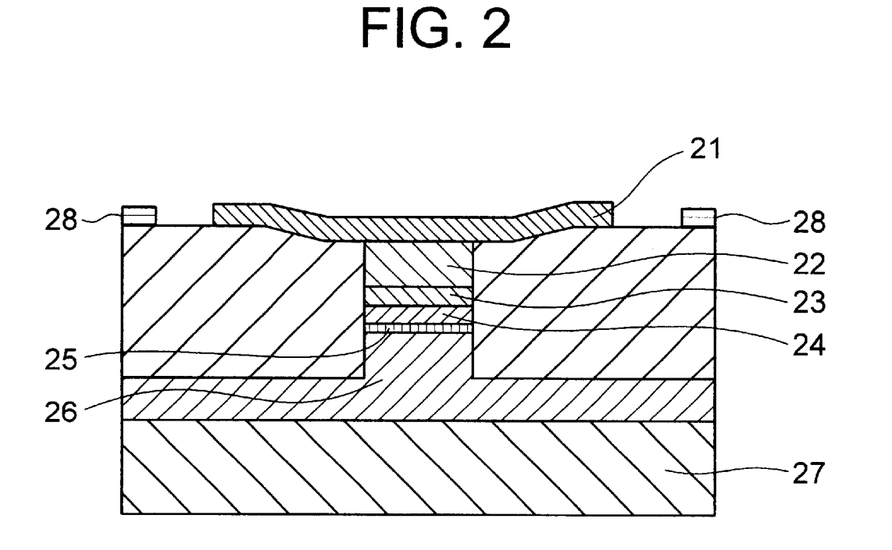
FIG. 2 is a cross-sectional view taken along line 14 on a modulator part of the basic configuration of the optical modulator according to Embodiment 1.

FIG. 2 is a cross-sectional view taken along line 14 on the optical modulator part. Reference numeral 21 in FIG. 2 denotes an electrode constituting a transmission line. The following layer structure is provided right below the electrode.

First, an InP layer 26, on which Si is doped with a concentration of $5 \times 10^{18}$ cm$^{-3}$, is stacked with a thickness of 1.5 μm on a semiconductor substrate 27 having Fe doped thereon. An n-side undoped layer 25 is grown thereon with a thickness of 20 nm and six MQW layers are each grown with a thickness of 90 nm. The MQW layer is made of InGaAlAs, a well layer has a width of 10 nm with a compressive strain of 0.5%. A barrier layer has a thickness of 5 nm and is composed of a layer having a tensile strain of 0.9%. At this moment, the MQW layer 24 is 90 nm in thickness and a composition ratio of the well and the barrier is $In_{0.7}Al_{0.049}Ga_{0.251}As$ and $In_{0.352}Al_{0.1}Ga_{0.54}As$.

An undoped layer 23 is formed with a thickness of 90 nm on the MQW layer. The layer has a smaller ratio of Ga as it is apart from the MQW layer, and a layer made of InAlAs is placed at the top in the range of 90 nm. Besides, an InP clad layer 22 is formed thereon with a thickness of 1.7 μm. As a doping level of the layer, a layer of $8 \times 10^{18}$ cm$^{-3}$ is formed with a thickness of 0.9 μm on a layer varied from $2 \times 10^{17}$ cm$^{-3}$ to $8 \times 10^{18}$ cm$^{-3}$ with a thickness of 0.7 μm. Further, a doping level of an InGaAs layer is a concentration of $1 \times 10^{19}$ cm$^{-3}$ with a thickness of 0.1 μm.

As shown in FIG. 2, a mesa serving as an optical waveguide is formed on such a multilayer substrate, and a polyimide material is used for flattening and reducing a capacitance on a part other than the waveguide. The mesa is 2.5 μm in width and 2.2 μm in height. The electrode 21 constituting the transmission line disposed thereon has a width of 8 μm and a thickness of 800 nm, which is formed by evaporating Au. Moreover, reference numeral 28 denotes an electrode for forming a ground, and a distance between the electrodes 21 and 28 is 20 μm. The electrode with a thickness of 600 nm is also formed by evaporating Au. The electrode is equivalent to reference numeral 13 in FIG. 1 and forms a ground.

Figure 8:
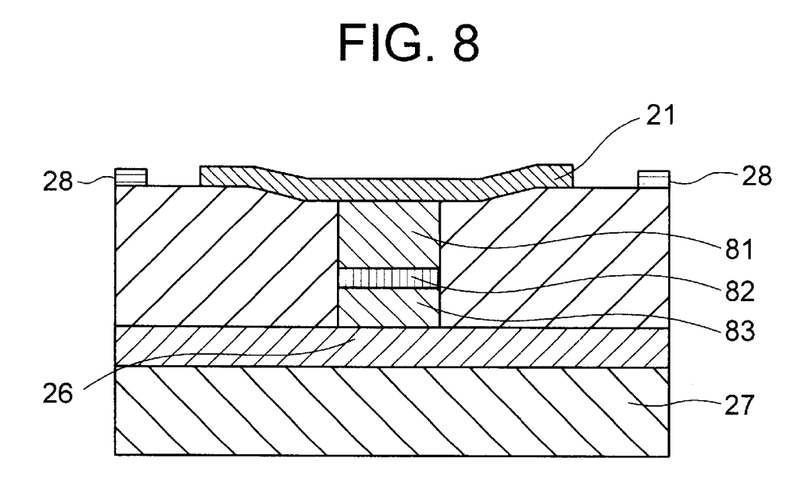
FIG. 8 is a cross-sectional view showing an optical waveguide in FIG. 1.

In FIG. 1, the input/output optical waveguide 1 is formed on the right and left of the optical modulator part 2. As shown in FIG. 8, the cross-sectional view is substantially identical to that of FIG. 2. The optical waveguide is composed of an undoped InP clad layer 83 having a thickness of 0.3 μm, an InGaAsP layer (82) which has a thickness of 0.2 μm and forms a core of the optical waveguide, and an InP clad 81 which has a high resistance by filling proton therein with a thickness of 1.7 μm. Thus, loss of light is reduced on the optical waveguide.

In FIG. 1, an input electrical signal is inputted from an input port 9, which is matched to characteristic impedance of 50Ω. An electrical signal is inputted as a voltage between the port electrode 9 and the ground 13. The electrical signal passes through a high impedance transmission line (8 μm in width and 400 μm in length) having impedance of 111 Ω and a bent transmission line of 45°. And then, the electrical signal is transmitted to the optical modulator part 2. At this moment, the electrical signal strides over a straight line 7.

Further, an electrical signal passing through the optical modulator is transmitted through the high impedance line 6 and an output port 10 and reaches a terminal resister 4. At this moment, the cross-sectional configurations of the high impedance lines 5 and 6 are identical to those of the input/output ports 9 and 10 in a laminating direction. FIG. 3 shows a cross-sectional view taken along line 15 as a representative configuration.

An electrode 31 (800 nm in thickness) constituting the transmission lines 5 and 6 or the input/output ports 9 and 10 is formed via a polyimide layer 32 (3.5 μm in thickness) disposed on a semiconductor substrate 33, and the ground electrode 34 (600 nm in thickness) is formed on both sides of the electrode 31. The transmission lines 5 and 6 are 8 μm in electrode width and the input/output ports 9 and 10 are 100 μm in electrode width. A width of the transmission line electrodes of 5 and 6 and the ground is 35 μm and a width of the input/output ports 9 and 10 is 60 μm. Besides, a thickness of the semiconductor substrate is 100 μm.

Further, output impedance of the driver circuit is 50Ω, and the driver circuit and the input port are connected to each other via a coplanar line having characteristic impedance of 50Ω and bonding with ribbonlike wires. Moreover, likewise, the output port and the terminal resister (50Ω) are connected to each other via the coplanar line and bonding with ribbonlike wires.

As a result, when a driving voltage is to 2.0V to be an (dynamic) extinction ration of 10 dB and the bandwidth is set 50 GHz, the fabricated modulator can obtain return loss S11 of −17 dB at 20 GHz. Such remarkable improvement can be achieved.

[Embodiment 2]

Figure 9:
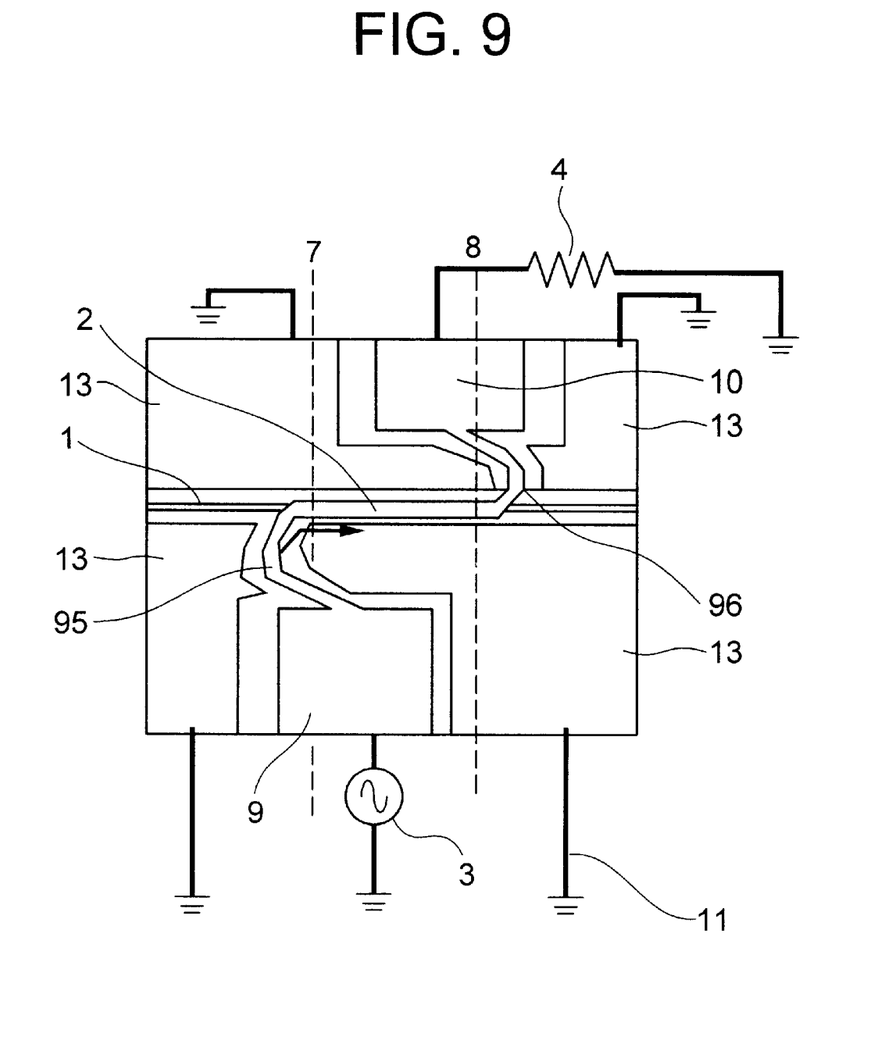
FIG. 9 is a top view showing an element in which a bent part is divided into two or more according to Embodiment 2 of the present invention.

FIG. 9 shows Embodiment 2 according to the present invention characterized in that a plurality of bent parts are provided on a transmission line to reduce a chip size and reflection of an input electrical signal. Bending at 60° or less, which is small in bending loss, is made for two times, and thus, a ground requiring a space is disposed at the same position as the modulator on a horizontal position. Thus, a chip area is reduced. In this embodiment, the transmission line has a width of 6 μm and bending is made at 45° for three times. Other configurations and sectional configurations are identical to those of Embodiment 1.

Therefore, a chip size can be reduced to a half or less, which is 400 μm in a longitudinal direction. It is possible to obtain return loss S11 of −18 dB at a value of 20 GHz.

[Embodiment 3]

Figure 10:
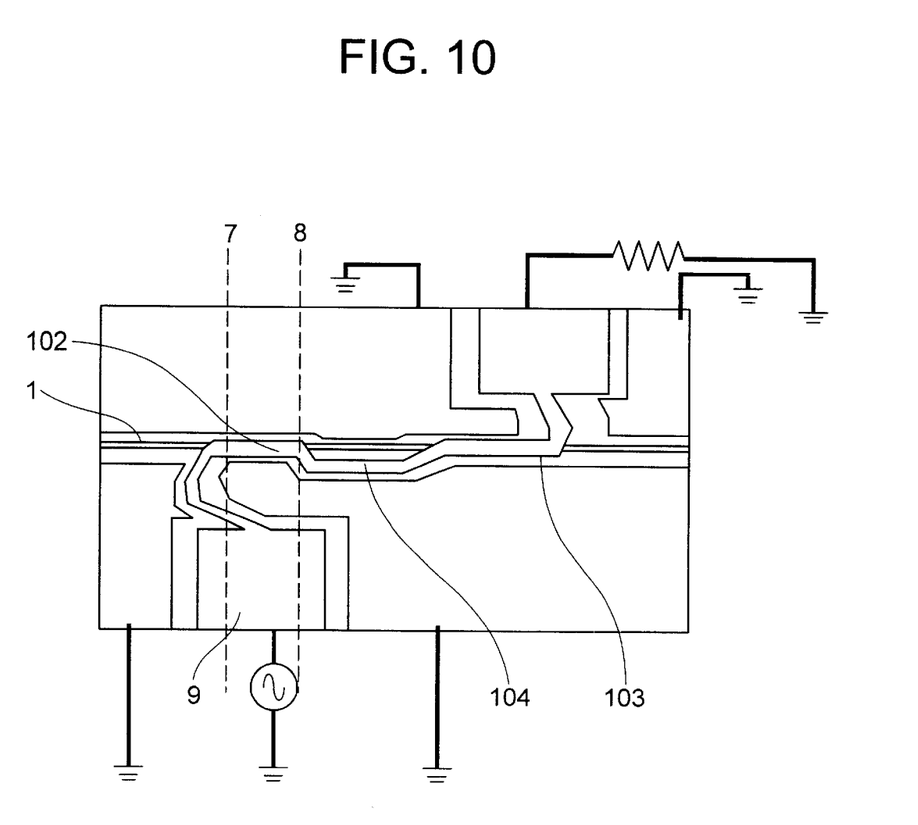
FIG. 10 is a top view showing an element in which an optical modulator is divided into two or more according to Embodiment 3 of the present invention.

FIG. 10 shows Embodiment 3 according to the present invention characterized in that an optical modulator part is divided into more than one part. With this configuration, a modulator length can be further increased. The optical modulator part is divided into two parts of 102 and 103, which are connected to each other via a high impedance line. The idea of impedance matching is the same as that of Embodiment 1. In this case, a distance is increased between two or more modulators and a propagating speed of an electrical signal is matched to that of an optical signal, thereby achieving a wider band. Although the above-mentioned Embodiments 1 to 3 relate to an electroabsorption modulator, it is possible to form a phase modulator with substantially the same configuration. In a phase modulator, a long phase modulating part is necessary for increasing a change in phase. With the present invention, it is possible to increase a length of a phase modulator.

[Embodiment 4]

Figure 11:
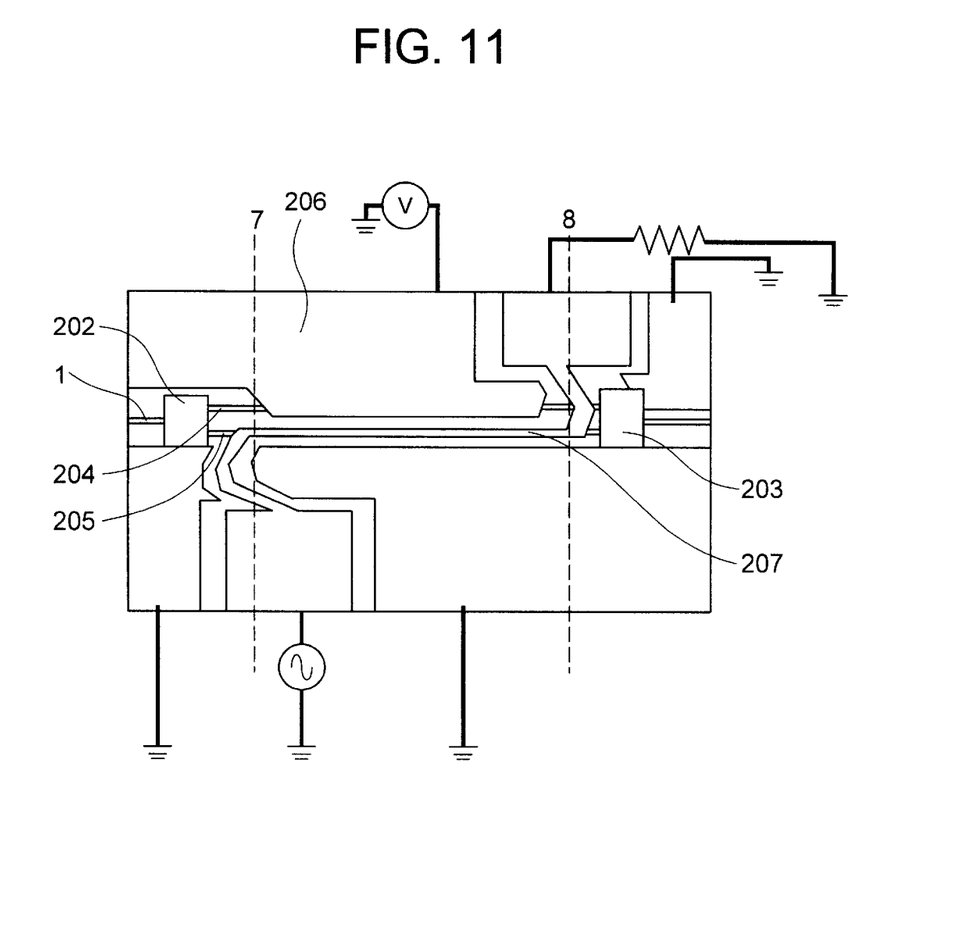
FIG. 11 is a top view showing an element using a Mach-Zehnder type modulator according to Embodiment 4 of the present invention.

FIG. 11 shows an embodiment characterized by adopting a Mach-Zehnder type modulator using MQW as an optical modulator. An input optical waveguide 1 is divided into waveguides 204 and 205 by a multi-mode optical coupler. The sectional configuration of the waveguides is identical to that of FIG. 2 but the number of MQW layers is eight instead of six. The MQW layers are equal in thickness and composition. And then, a constant bias voltage is applied to the waveguide 204 by using an electrode 206, an electrical signal is applied to the waveguide 205 from a transmission line 207 to change an index of refraction of the MQW, resulting in a change in phase, and then, a multi-mode coupler combines waves to form the modulator. At this moment, although a driving voltage needs to be lowered, since an undoped layer is 230 nm in thickness, phase modulation is possible at a low voltage of 2 V.

According to the embodiments of the present invention, it is possible to achieve a low driving voltage and a high optical output while maintaining a reflectivity and high frequency response of an input electrical signal in a wide band.

What is claimed is:

1. An optical transmitter, comprising:
    an optical waveguide having a substantially straight line on a plane; and an optical modulator sandwiched in the optical waveguide on the substantially straight line of the optical waveguide, said optical modulator having an electrical transmission line portion passing through an upper part of the optical modulator and a ground electrode provided on a lower part of the optical modulator, the optical modulator performs a modulating operation by applying voltage between the electrical transmission line portion on the upper part of the optical modulator serving as an electrode and the ground electrode on the lower part of the optical modulator, wherein first and second straight reference lines provided so as to sandwich the optical modulator on both ends with respect to a light propagation direction of the optical modulator, the first and second straight reference lines extending perpendicularly to the light propagation direction, a path of an electrical transmission line is provided in series from a modulator driver circuit via said electrical transmission line portion of the optical modulator to a terminal resistor, said terminal resistor is positioned on the opposite side to the modulator driver circuit with respect to the optical modulator, and said path of the electrical transmission line is provided so as to traverse the first and second straight reference lines, and a section from the driver circuit to the modulator crossed by said first straight reference line serves as a first electrical transmission line, a section from the modulator to the terminal resistor serves as a second electrical transmission line, at least part of a section of at least one of the first and second electrical transmission lines has a larger characteristic impedance than output impedance of the driver circuit, and said characteristic impedance of said first and second electrical transmission lines is larger than that of the electrical transmission line portion of the optical modulator.

2. The optical transmitter according to claim 1, wherein the electrical transmission line portion of the optical modulator between the first and second electrical transmission lines is a straight line and has impedance smaller than output impedance of the driver circuit.

3. The optical transmitter according to claim 1, wherein the optical modulator includes at least an electrode serving as means for applying voltage and an absorption which is disposed in the vicinity of the electrode and in which absorption coefficient of a light with a wavelength varies according to an intensity of an electric field generated by voltage.

4. The optical transmitter according to claim 1, wherein the optical modulator is one of a Mach-Zehnder type modulator and an EA (Electroabsorption) modulator.

5. The optical transmitter according to claim 1, wherein the optical modulator includes an electrode serving as means for applying voltage to the optical modulator and a phase modulator which is disposed in the vicinity of the electrode and in which an index of refraction of a light with a wavelength varies according to an intensity of an electric field generated by voltage.

6. The optical transmitter according to claim 1, wherein the optical modulator has a return loss of not more than −17 dB in an input signal frequency band of 0–20 GHz.

7. An optical modulator, comprising:
an optical waveguide having a substantially straight line on a plane; and
an optical modulator sandwiched in the optical waveguide on the substantially straight line of the optical waveguide, said optical modulator having an electrical transmission line portion passing through an upper part of the optical modulator and a ground electrode provided on a lower part of the optical modulator, the optical modulator performs a modulating operation by applying voltage between the electrical transmission line portion on the upper part of the optical modulator serving as an electrode the ground electrode on the lower part of the optical modulator, wherein first and second straight reference lines provided so as to sandwich the optical modulator on both ends with respect to a light propagation direction of the optical modulator, the first and second straight reference lines extending perpendicularly to the light propagation direction, a path of an electrical transmission line is provided in series from a modulator driver circuit via said electrical transmission line portion of the optical modulator to a terminal resistor, said terminal resistor is positioned on the opposite side to the modulator driver circuit with respect to the optical modulator, and said path of the electrical transmission line is provided so as to traverse the first and second straight reference lines, and a section from the driver circuit to the modulator crossed by said first straight reference line serves as a first electrical transmission line, a section from the modulator to the terminal resistor serves as a second electrical transmission line, the electrical transmission line portion of the optical modulator is a straight line, the first or second electrical transmission line crosses at an angle of less than 90° with the electrical transmission line portion of the optical modulator, and at least part of a section of at least one of the first and second electrical transmission lines has a larger characteristic impedance than output impedance of the driver circuit, and said characteristic impedance of said first and second electrical transmission lines is larger than that of the electrical transmission line portion of the optical modulator.

8. The optical modulator according to claim 7, wherein the crossing angle is less than 80°.

9. The optical modulator according to claim 7, wherein the crossing angle is less than 70°.

10. The optical modulator according to claim 7, wherein the optical modulator includes at least an electrode serving as means for applying voltage and an absorption layer which is disposed in the vicinity of the electrode and in which absorption coefficient of a light with a wavelength varies according to an intensity of an electric field generated by voltage.

11. The optical modulator according to claim 7, wherein the optical modulator is one of a Mach-Zehnder type modulator and an EA modulator.

12. The optical modulator according to claim 7, wherein the optical modulator includes an electrode serving as means for applying voltage to the optical modulator and a phase modulator which is disposed in the vicinity of the electrode and in which an index of refraction of a light with a wavelength varies according to an intensity of an electric field generated by voltage.

13. The optical modulator according to claim 7, wherein the optical modulator has a return loss of not more than −17 dB in an input signal frequency band of 0–20 GHz.

14. An optical modulator, comprising:
an optical waveguide having a substantially straight line on a plane; and
an optical modulator sandwiched in the optical waveguide on the substantially straight line of the optical waveguide, said optical modulator having an electrical transmission line portion passing through an upper part of the optical modulator and a ground electrode provided on a lower part of the optical modulator, the optical modulator performs a modulating operation by applying voltage between the electrical transmission line portion on the upper part of the optical modulator serving as an electrode and the ground electrode on the lower part of the optical modulator, wherein first and second straight reference lines provided so as to sandwich the optical modulator on both ends with respect to a light propagation direction of the optical modulator, the first and second straight reference lines extending perpendicularly to the light propagation direction, a path of an electrical transmission line is provided in series from a modulator driver circuit via said electrical transmission line portion of the optical modulator to a terminal resistor, said terminal resistor is positioned on the opposite side to the modulator driver circuit with respect to the optical modulator, and said path of the electrical transmission line is provided so as to traverse the first and second straight reference lines, a section from the driver circuit to the modulator crossed by said first straight reference line serves as a first electrical transmission line, a section from the modulator to the terminal resistor serves as a second electrical transmission line, the electrical transmission line portion of the optical modulator is a straight line, and a total length of the electrical transmission line formed into a straight line between the first and second electrical transmission lines is shorter than a wavelength of an electrical signal inputted to the modulator, and at least part of a section of at least one of the first and second electrical transmission lines has a larger characteristic impedance than output impedance of the driver circuit, and said characteristic impedance of said first and second electrical transmission lines is larger than that of the electrical transmission line portion of the optical modulator.

15. The optical modulator according to claim 14, wherein the optical modulator includes at least an electrode serving as means for applying voltage and an absorption which is disposed in vicinity of the electrode and in which absorption coefficient of a light with a wavelength varies according to an intensity of an electric field generated by voltage.

16. The optical modulator according to claim 14, wherein the optical modulator is one of a Mach-Zehnder type modulator and an EA modulator.

17. The optical modulator according to claim 14, wherein the optical modulator includes an electrode serving as means for applying voltage to the optical modulator and a phase modulator layer which is disposed in the vicinity of the electrode and in which an index of refraction of light of a wavelength varies according to an intensity of an electric field generated by voltage.

18. The optical modulator according to claim 14, wherein the optical modulator is a traveling wave type.

19. The optical modulator according to claim 14, wherein the optical modulator has a return loss of not more than −17 dB in an input signal frequency band of 0–20 GHz.

* * * * *